United States Patent
Brown

(10) Patent No.: US 12,072,406 B2
(45) Date of Patent: *Aug. 27, 2024

(54) AUGMENTED REALITY PRECISION TRACKING AND DISPLAY

(71) Applicant: Snap Inc., Santa Monica, CA (US)

(72) Inventor: Ted Brown, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,581

(22) Filed: Apr. 24, 2023

(65) Prior Publication Data

US 2023/0258756 A1    Aug. 17, 2023

Related U.S. Application Data

(63) Continuation of application No. 17/161,213, filed on Jan. 28, 2021, now Pat. No. 11,740,313.
(Continued)

(51) Int. Cl.
*G01S 1/04* (2006.01)
*G06F 3/01* (2006.01)
(Continued)

(52) U.S. Cl.
CPC .......... *G01S 1/0423* (2019.08); *G01S 1/0428* (2019.08); *G06F 3/012* (2013.01); *G06T 7/20* (2013.01);
(Continued)

(58) Field of Classification Search
CPC ...... G01S 1/0423; G01S 1/0428; G06F 3/012; G06T 7/20; G06T 17/10; G06T 19/006; H04B 1/71635
See application file for complete search history.

(56) References Cited

U.S. PATENT DOCUMENTS 6,028,271 A    2/2000  Gillespie et al.
6,323,846 B1   11/2001 Westerman et al.
(Continued)

FOREIGN PATENT DOCUMENTS

CN    106199511 A    12/2016
EP      3116615 A1    1/2017
(Continued)

OTHER PUBLICATIONS

Cas and Chary VR: https://www.youtube.com/watch?v = _8VqQfr HG94 , viewed on Dec. 4, 2021, published online on Feb. 25, 2020 (Year: 2020).
(Continued)

*Primary Examiner* — Terrell M Robinson
(74) *Attorney, Agent, or Firm* — Culhane PLLC; Stephen J. Weed

(57) ABSTRACT

Example systems, devices, media, and methods for tracking movable objects and presenting virtual elements on a display in proximity to the movable objects. Ultra-wideband (UWB) transmitters are mounted to each movable object in an environment including at least two synchronized UWB receivers. The receivers calculate current locations of movable objects. Portable electronic devices, including eyewear devices, are paired with the receivers in a network. A localization application determines a current location of each eyewear device. A rendering application presents virtual elements on a display as an overlay relative to the current movable object location and in relative proximity to the current eyewear location. The physical environment is represented by a static mesh. A time synchronized tracking application identifies moving items that are not coupled to a UWB transmitter. The rendering application presents the virtual elements on the display in accordance with the static mesh and the moving items.

20 Claims, 12 Drawing Sheets

Related U.S. Application Data

(60) Provisional application No. 63/131,961, filed on Dec. 30, 2020.

(51) Int. Cl.
  *G06T 7/20* (2017.01)
  *G06T 17/10* (2006.01)
  *G06T 19/00* (2011.01)
  *H04B 1/7163* (2011.01)

(52) U.S. Cl.
  CPC ............ *G06T 17/10* (2013.01); *G06T 19/006* (2013.01); *H04B 1/71635* (2013.01)

(56) References Cited

U.S. PATENT DOCUMENTS

| | | |
|---|---|---|
| 8,799,821 B1 | 8/2014 | Rose et al. |
| 9,024,842 B1 | 5/2015 | Gomez et al. |
| 9,098,739 B2 | 8/2015 | Mutto et al. |
| 9,207,771 B2 | 12/2015 | Antoniac |
| 9,235,051 B2 | 1/2016 | Salter et al. |
| 9,459,454 B1 | 10/2016 | The et al. |
| 9,541,996 B1 | 1/2017 | Baxter et al. |
| 9,552,673 B2 | 1/2017 | Hilliges et al. |
| 9,671,566 B2 | 6/2017 | Abovitz et al. |
| 9,990,029 B2 | 6/2018 | Kochi |
| 9,996,983 B2 | 6/2018 | Mullins |
| 10,057,400 B1 | 8/2018 | Gordon et al. |
| 10,146,414 B2 | 12/2018 | Heater |
| 10,220,303 B1 | 3/2019 | Schmidt et al. |
| 10,288,419 B2 | 5/2019 | Abovitz et al. |
| 10,372,228 B2 | 8/2019 | Mao et al. |
| 10,394,334 B2 | 8/2019 | Wang |
| 10,429,923 B1 | 10/2019 | Johnston et al. |
| 10,509,461 B2 | 12/2019 | Mullen |
| 10,579,207 B2 | 3/2020 | Piya et al. |
| 10,642,369 B2 | 5/2020 | Iyer et al. |
| 10,782,779 B1 | 9/2020 | Eubank et al. |
| 10,852,838 B2 | 12/2020 | Bradski et al. |
| 10,853,991 B1 | 12/2020 | Yan et al. |
| 10,866,093 B2 | 12/2020 | Abovitz et al. |
| 10,902,250 B2 | 1/2021 | Konin et al. |
| 10,909,762 B2 | 2/2021 | Karalis et al. |
| 10,928,975 B2 | 2/2021 | Wang et al. |
| 10,936,080 B2 | 3/2021 | Marcolina et al. |
| 11,003,307 B1 | 5/2021 | Ravasz et al. |
| 11,086,126 B1 | 8/2021 | Gollier et al. |
| 11,275,453 B1 | 3/2022 | Tham et al. |
| 11,277,597 B1 | 3/2022 | Canberk et al. |
| 11,294,472 B2 | 4/2022 | Tang et al. |
| 11,320,911 B2 | 5/2022 | Schwarz et al. |
| 11,334,179 B2 | 5/2022 | Li et al. |
| 11,380,021 B2 | 7/2022 | Nakata |
| 11,481,025 B2 | 10/2022 | Shimizu et al. |
| 11,494,000 B2 | 11/2022 | Katz et al. |
| 11,500,512 B2 | 11/2022 | Reithmeir et al. |
| 11,520,399 B2 | 12/2022 | Kang et al. |
| 11,531,402 B1 | 12/2022 | Stolzenberg |
| 11,546,505 B2 | 1/2023 | Canberk |
| 11,631,228 B2 | 4/2023 | Fieldman |
| 2005/0271279 A1 | 12/2005 | Fujimura et al. |
| 2007/0220108 A1 | 9/2007 | Whitaker |
| 2008/0219502 A1 | 9/2008 | Shamaie |
| 2009/0119609 A1 | 5/2009 | Matsumoto |
| 2010/0085317 A1 | 4/2010 | Park et al. |
| 2011/0213664 A1 | 9/2011 | Osterhout et al. |
| 2012/0027252 A1 | 2/2012 | Liu et al. |
| 2012/0027263 A1 | 2/2012 | Liu et al. |
| 2012/0056730 A1 | 3/2012 | Ujiie et al. |
| 2012/0086729 A1 | 4/2012 | Baseley et al. |
| 2012/0113223 A1 | 5/2012 | Hilliges et al. |
| 2012/0194644 A1 | 8/2012 | Newcombe et al. |
| 2012/0327117 A1 | 12/2012 | Weller et al. |
| 2013/0145320 A1 | 6/2013 | Oosterholt et al. |
| 2013/0328927 A1 | 12/2013 | Mount et al. |
| 2013/0335324 A1 | 12/2013 | Kaplan et al. |
| 2014/0043211 A1 | 2/2014 | Park |
| 2014/0212000 A1 | 7/2014 | Yagcioglu et al. |
| 2014/0225918 A1 | 8/2014 | Mittal et al. |
| 2014/0306993 A1 | 10/2014 | Poulos et al. |
| 2014/0347289 A1 | 11/2014 | Suh et al. |
| 2014/0361988 A1 | 12/2014 | Katz et al. |
| 2014/0368533 A1 | 12/2014 | Salter et al. |
| 2015/0049017 A1 | 2/2015 | Weber et al. |
| 2015/0073753 A1 | 3/2015 | Rameau |
| 2015/0091824 A1 | 4/2015 | Hori |
| 2015/0097719 A1 | 4/2015 | Balachandreswaran et al. |
| 2015/0109187 A1 | 4/2015 | Maeda et al. |
| 2015/0109197 A1 | 4/2015 | Takagi |
| 2015/0169176 A1 | 6/2015 | Cohen et al. |
| 2015/0199780 A1 | 7/2015 | Beyk |
| 2015/0269783 A1 | 9/2015 | Yun |
| 2015/0317833 A1 | 11/2015 | Ebstyne et al. |
| 2015/0331576 A1 | 11/2015 | Piya et al. |
| 2015/0370321 A1 | 12/2015 | Lundberg |
| 2016/0033770 A1 | 2/2016 | Fujimaki et al. |
| 2016/0035134 A1 | 2/2016 | Tanaka et al. |
| 2016/0098093 A1 | 4/2016 | Cheon et al. |
| 2016/0260251 A1 | 9/2016 | Stafford et al. |
| 2016/0261834 A1 | 9/2016 | Li et al. |
| 2016/0306431 A1 | 10/2016 | Stafford et al. |
| 2017/0003746 A1 | 1/2017 | Anglin et al. |
| 2017/0014683 A1 | 1/2017 | Maruyama et al. |
| 2017/0028299 A1 | 2/2017 | The et al. |
| 2017/0053447 A1 | 2/2017 | Chen et al. |
| 2017/0097687 A1 | 4/2017 | Pinault et al. |
| 2017/0123487 A1 | 5/2017 | Hazra et al. |
| 2017/0124713 A1 | 5/2017 | Jurgenson et al. |
| 2017/0140552 A1 | 5/2017 | Woo et al. |
| 2017/0235372 A1 | 8/2017 | Song et al. |
| 2017/0270711 A1 | 9/2017 | Schoenberg |
| 2017/0293364 A1 | 10/2017 | Wang |
| 2017/0295446 A1 | 10/2017 | Shivappa |
| 2017/0323488 A1 | 11/2017 | Mott et al. |
| 2017/0352184 A1 | 12/2017 | Poulos et al. |
| 2017/0357334 A1 | 12/2017 | Balan et al. |
| 2018/0005443 A1 | 1/2018 | Poulos et al. |
| 2018/0024641 A1 | 1/2018 | Mao et al. |
| 2018/0039852 A1 | 2/2018 | Nakamura et al. |
| 2018/0075659 A1 | 3/2018 | Browy et al. |
| 2018/0196503 A1 | 7/2018 | Ikeda et al. |
| 2018/0259775 A1 | 9/2018 | Ono et al. |
| 2018/0329209 A1 | 11/2018 | Nattukallingal |
| 2019/0025595 A1 | 1/2019 | Fukuda et al. |
| 2019/0025931 A1 | 1/2019 | Anderson et al. |
| 2019/0102927 A1 | 4/2019 | Yokokawa |
| 2019/0122085 A1 | 4/2019 | Tout et al. |
| 2019/0139320 A1* | 5/2019 | Davies .................... G06T 7/248 |
| 2019/0146598 A1 | 5/2019 | Peri |
| 2019/0155394 A1 | 5/2019 | Bedikian et al. |
| 2019/0167352 A1* | 6/2019 | Mahfouz ............ A61F 2/30942 |
| 2019/0220098 A1 | 7/2019 | Gupta |
| 2019/0251696 A1 | 8/2019 | Wang et al. |
| 2019/0299059 A1 | 10/2019 | Case, Jr. et al. |
| 2019/0318544 A1 | 10/2019 | Skidmore et al. |
| 2019/0324553 A1 | 10/2019 | Liu et al. |
| 2019/0325651 A1 | 10/2019 | Bradner et al. |
| 2019/0361521 A1 | 11/2019 | Stellmach et al. |
| 2019/0362562 A1 | 11/2019 | Benson |
| 2019/0377416 A1 | 12/2019 | Alexander |
| 2019/0385371 A1 | 12/2019 | Joyce et al. |
| 2020/0005026 A1 | 1/2020 | Andersen et al. |
| 2020/0064924 A1 | 2/2020 | Poupyrev et al. |
| 2020/0097065 A1 | 3/2020 | Iyer et al. |
| 2020/0151900 A1* | 5/2020 | Weising .................... G06T 7/70 |
| 2020/0218423 A1 | 7/2020 | Ohashi |
| 2020/0311396 A1 | 10/2020 | Pollefeys et al. |
| 2020/0312029 A1 | 10/2020 | Heinen et al. |
| 2020/0387228 A1 | 12/2020 | Ravasz et al. |
| 2021/0019036 A1 | 1/2021 | Wang et al. |
| 2021/0026455 A1 | 1/2021 | Dash et al. |
| 2021/0041702 A1 | 2/2021 | Kimura et al. |
| 2021/0090337 A1 | 3/2021 | Ravasz et al. |
| 2021/0096726 A1 | 4/2021 | Faulkner et al. |

(56) References Cited

U.S. PATENT DOCUMENTS

| | | | |
|---|---|---|---|
| 2021/0174519 A1 | 6/2021 | Bazarevsky et al. | |
| 2021/0181938 A1 | 6/2021 | Hassan et al. | |
| 2021/0183158 A1* | 6/2021 | Korngold | G06F 3/04815 |
| 2021/0208698 A1 | 7/2021 | Martin et al. | |
| 2021/0209153 A1 | 7/2021 | Zhang | |
| 2021/0263593 A1 | 8/2021 | Lacey | |
| 2021/0275914 A1 | 9/2021 | Wu et al. | |
| 2021/0286502 A1 | 9/2021 | Lemay et al. | |
| 2021/0334524 A1 | 10/2021 | Guo et al. | |
| 2021/0373650 A1 | 12/2021 | Kang et al. | |
| 2021/0397266 A1 | 12/2021 | Gupta et al. | |
| 2022/0088476 A1 | 3/2022 | Canberk et al. | |
| 2022/0103748 A1 | 3/2022 | Canberk | |
| 2022/0139056 A1 | 5/2022 | Fieldman | |
| 2022/0171479 A1 | 6/2022 | Chappaz et al. | |
| 2022/0179495 A1 | 6/2022 | Agrawal et al. | |
| 2022/0206102 A1 | 6/2022 | Brown | |
| 2022/0206588 A1 | 6/2022 | Canberk et al. | |
| 2022/0326781 A1 | 10/2022 | Hwang et al. | |
| 2022/0334649 A1 | 10/2022 | Hwang et al. | |
| 2023/0082789 A1 | 3/2023 | Lu et al. | |
| 2023/0117197 A1 | 4/2023 | Stolzenberg | |
| 2023/0274511 A1* | 8/2023 | Miller | G06T 7/60 345/633 |

FOREIGN PATENT DOCUMENTS

| | | |
|---|---|---|
| EP | 3699736 A1 | 8/2020 |
| KR | 100793834 B1 | 1/2008 |
| WO | 2015192117 A1 | 12/2015 |

OTHER PUBLICATIONS

Chatain, Julia et al., "DigiGlo: Exploring the Palm as an Input and Display Mechanism through Digital Gloves," Association for Computing Machinery, CHI PLAY '20, Nov. 2-4, 2020, Virtual Event, Canada, 12 pages.

Cirulis Arnis: "Large Scale Augmented Reality for Collaborative Environments", Jul. 10, 2020 (Jul. 10, 2020), Computer Vision—ECCV 2020 : 16th European Conference, Glasgow, UK, Aug. 23-28, 2020 : Proceedings; [Lecture Notes in Computer Science ; ISSN 0302-9743], Springer International Publishing, Cham, pp. 325-335, XP047554326, ISBN: 978-3-030-58594-5.

Engadget: "Google Glass Gesture Recognition by OnTheGo Platforms at CES 2014 : Engadget", Jan. 8, 2014 (Jan. 8, 2014), XP055859805, Retrieved from the Internet: URL: https://www.youtube.com/watch?v=d_il_ZxPECg [retrieved on Nov. 11, 2021] 00:39s, 00:55s, 01:00-01:10s.

Google Atap: "Welcome to Project Soli", published May 29, 2015, XP055903745, Retrieved from the Internet: URL: https://www.youtube.com/watch?v=OQNiZf SsPc0&t=61s [retrieved on Mar. 21, 2022].

International Search Report and Written Opinion for International Application No. PCT/US2021/033642, dated Aug. 30, 2021 (Aug. 30, 2021)—11 pages.

International Search Report and Written Opinion for International Application No. PCT/US2021/051109, dated Dec. 10, 2021 (Oct. 12, 2021)—17 pages.

International Search Report and Written Opinion for International Application No. PCT/US2021/063295, dated Mar. 17, 2022 (Mar. 17, 2022)—13 pages.

International Search Report and Written Opinion for International Application No. PCT/US2021/063340, dated Apr. 4, 2022 (Apr. 5, 2022)—10 pages.

International Search Report and Written Opinion for International Application No. PCT/US2022/023608, dated Jul. 11, 2022 (Nov. 7, 2022)—12 pages.

International Search Report and Written Opinion for International Application No. PCT/US2022/024565, dated Jul. 25, 2022 (Jul. 25, 2022)—15 pages.

Matthias Schwaller et al: "Pointing in the Air: Measuring the Effect of Hand Selection Strategies on Performance and Effort", Jul. 1, 2013 (Jul. 1, 2013), Human Factors in Computing and Informatics Springer Berlin Heidelberg, Berlin, Heidelberg, pp. 732-747, XP047033542, ISBN: 978-3-642-39061-6, p. 740; figure 4.

Partial International Search Report and Written Opinion for International Application No. PCT/US2021/047637, dated Jan. 7, 2022 (Jul. 1, 2022)—10 pages.

Song, Chen, "Sensor Fusion for Learning-based Tracking of Controller Movement in Virtual Reality". Sep. 2019, IEEE, pp. 1-5. (Year: 2019).

U.S. Appl. No. 16/865,995, filed May 4, 2020 to Canberk, et al.

U.S. Appl. No. 17/588,934, filed Jan. 31, 2022 to Stolzenberg, et al.

1st European Office Action for European Application No. 21773937.4 dated May 2, 2024, 6 pages.

\* cited by examiner

AUGMENTED REALITY PRECISION TRACKING AND DISPLAY

CROSS-REFERENCE TO RELATED APPLICATIONS

This application is a Continuation of U.S. application Ser. No. 17/161,213 filed on Jan. 28, 2021, and claims priority to U.S. Provisional Application Ser. No. 63/131,961 filed on Dec. 30, 2020, the contents of both of which are incorporated fully herein by reference.

TECHNICAL FILED

Examples set forth in the present disclosure relate to the field of augmented reality and wearable electronic devices, such as eyewear. More particularly, but not by way of limitation, the present disclosure describes the display of virtual elements in proximity to movable objects, which are tracked using ultra-wideband (UWB) technology.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays.

Ultra-wideband (UWB) is a radio-based technology for short-range, high-bandwidth pulses for transmitting data. IEEE 802.15.4a sets forth the international technical standard for the physical layers associated with UWB transmissions. In the context of tracking, two or more UWB receivers are placed in a physical space and time synchronized. UWB transmitters attached to movable objects emit a pulse periodically. Each receiver timestamps the arrival of each pulse. The timestamps are used by multilateration algorithms to compute the precise location (x, y, z) of each transmitter (on each movable object) based on the time difference of arrival of each pulse at each receiver. The pulse transmitters broadcast pulses over a relatively short range (e.g., up to 250 meters) and operate on relatively low power (e.g., one milliwatt).

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects.

Computer vision and AR systems continually scan all the objects in a physical environment, both stationary and moving, without detecting the identity of any particular object or differentiating it from other objects. For example, an open door is detected and scanned without regard for whether it is related to the same door, in a closed position, detected in a previous scan. In the current scan, the open door is identified as a new door. Computer vision and AR systems do not maintain a continuity of identity associated with movable objects.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
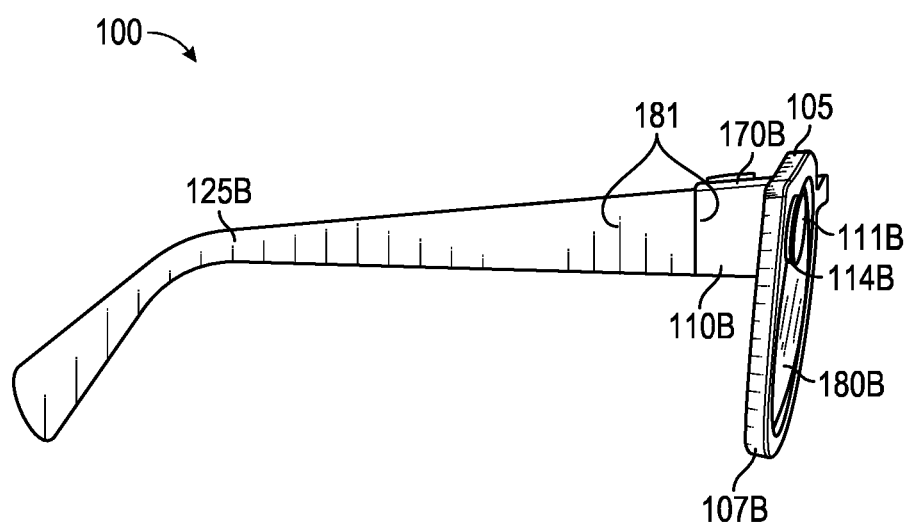
FIG. 1A is a side view (right) of an example hardware configuration of an eyewear device suitable for use in a tracking and display system.

Various implementations and details are described with reference to examples, including an example system for tracking movable objects and displaying virtual elements in relative proximity to the movable objects. The system in this example includes an ultra-wideband (UWB) pulse transmitter coupled to a movable object in a physical environment and configured to broadcast a pulse comprising a unique identifier, at least two synchronized receivers at fixed receiver locations relative to the physical environment. An object location application calculates a current object location of the movable object based on the broadcast pulse. An eyewear device in paired communication with the receivers includes a processor, a memory, a localization application, a rendering application, and a display. The localization application determines a current eyewear location of the eyewear device. The rendering application presents a virtual element on a display as an overlay relative to the calculated current object location and in relative proximity to the determined current eyewear location.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
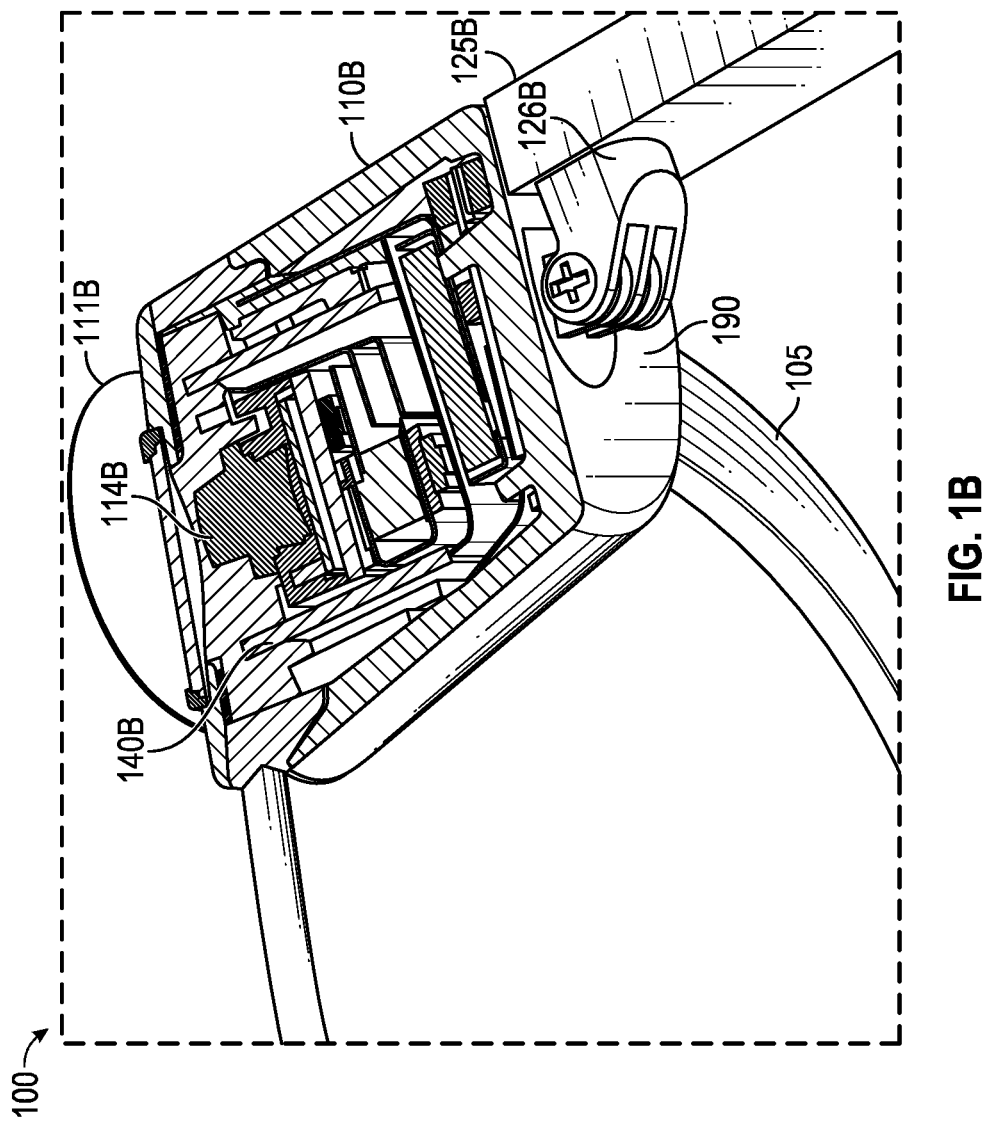
FIG. 1B is a perspective, partly sectional view of a right corner of the eyewear device of FIG. 1A depicting a right visible-light camera, and a circuit board.
Figure 1C:
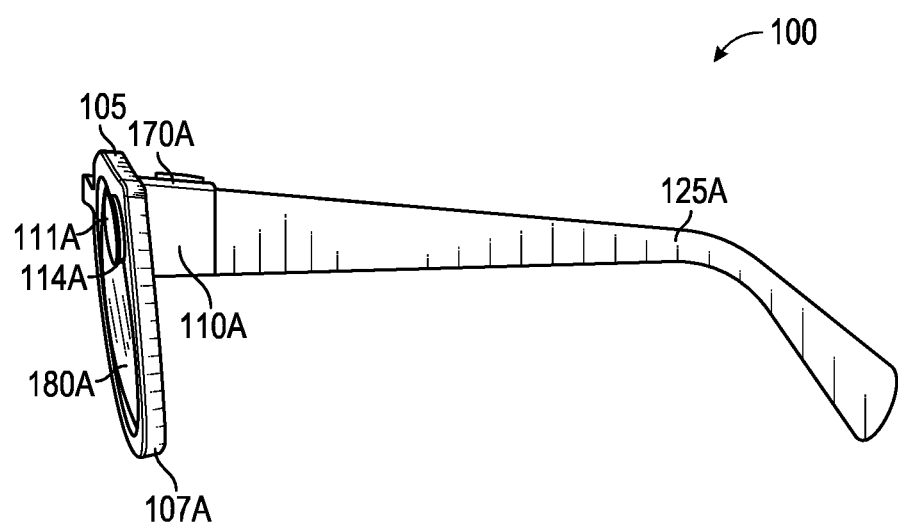
FIG. 1C is a side view (left) of an example hardware configuration of the eyewear device of FIG. 1A, which shows a left visible-light camera.
Figure 1D:
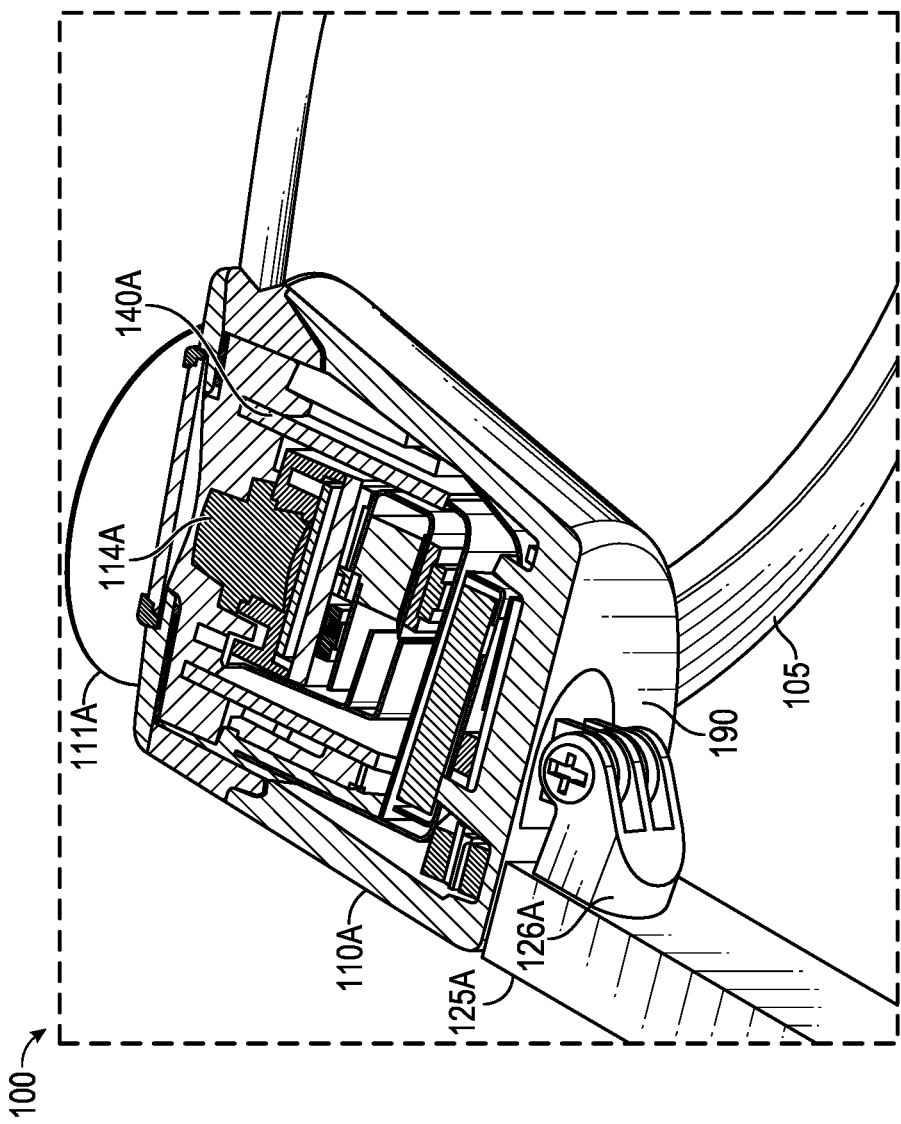
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
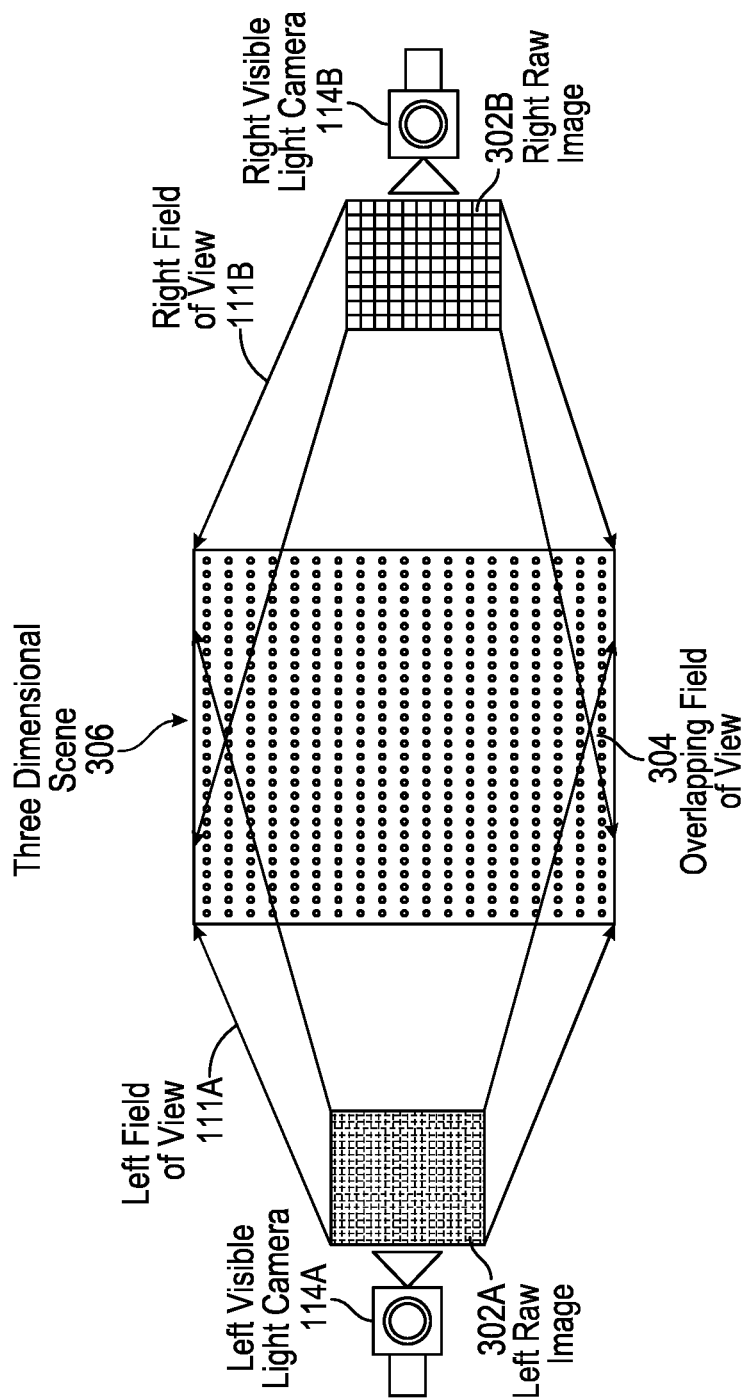
FIG. 3 is a diagrammatic depiction of a three-dimensional scene, a left raw image captured by a left visible-light camera, and a right raw image captured by a right visible-light camera of the eyewear device of FIG. 1A.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126B connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
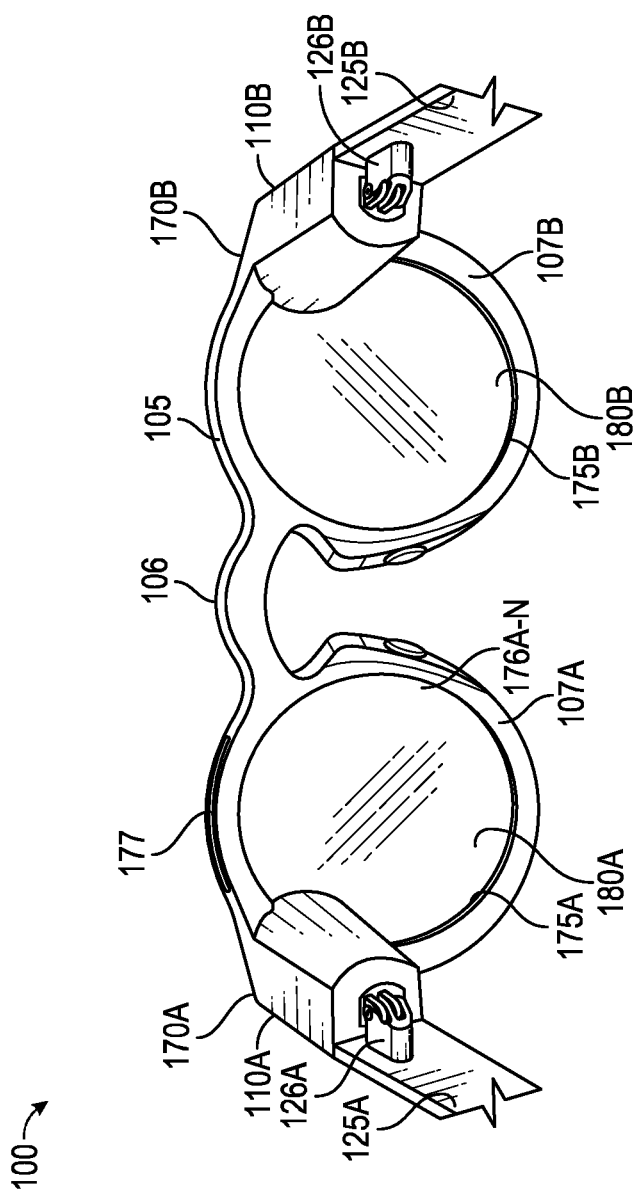
FIGS. 2A and 2B are rear views of example hardware configurations of an eyewear device of FIG. 1A.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
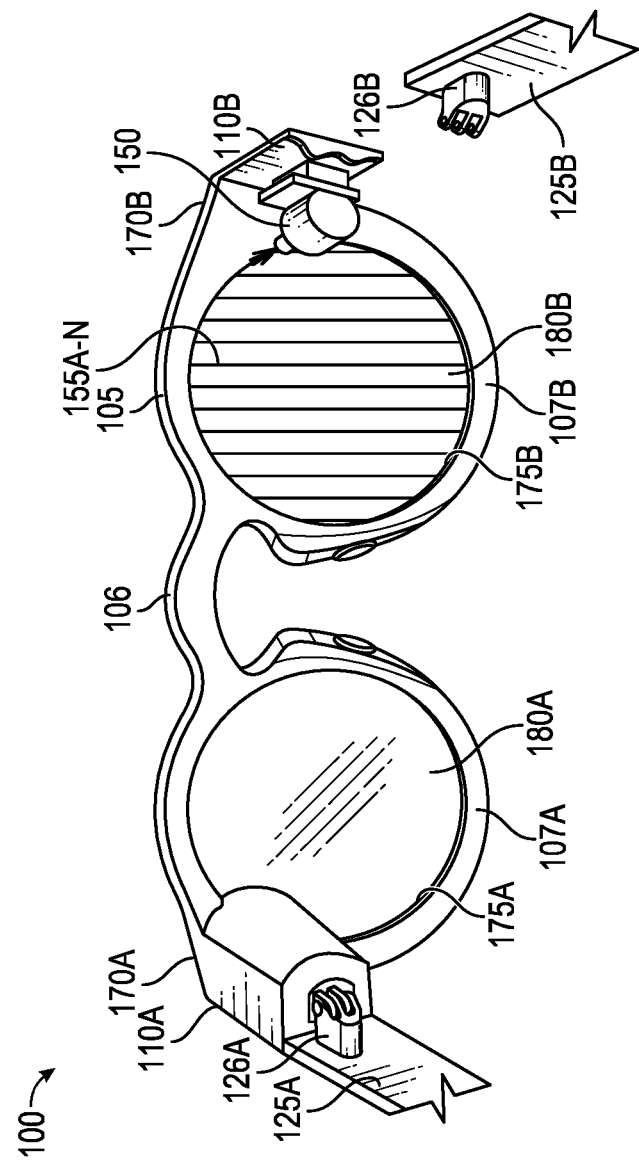

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the tracking and display system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
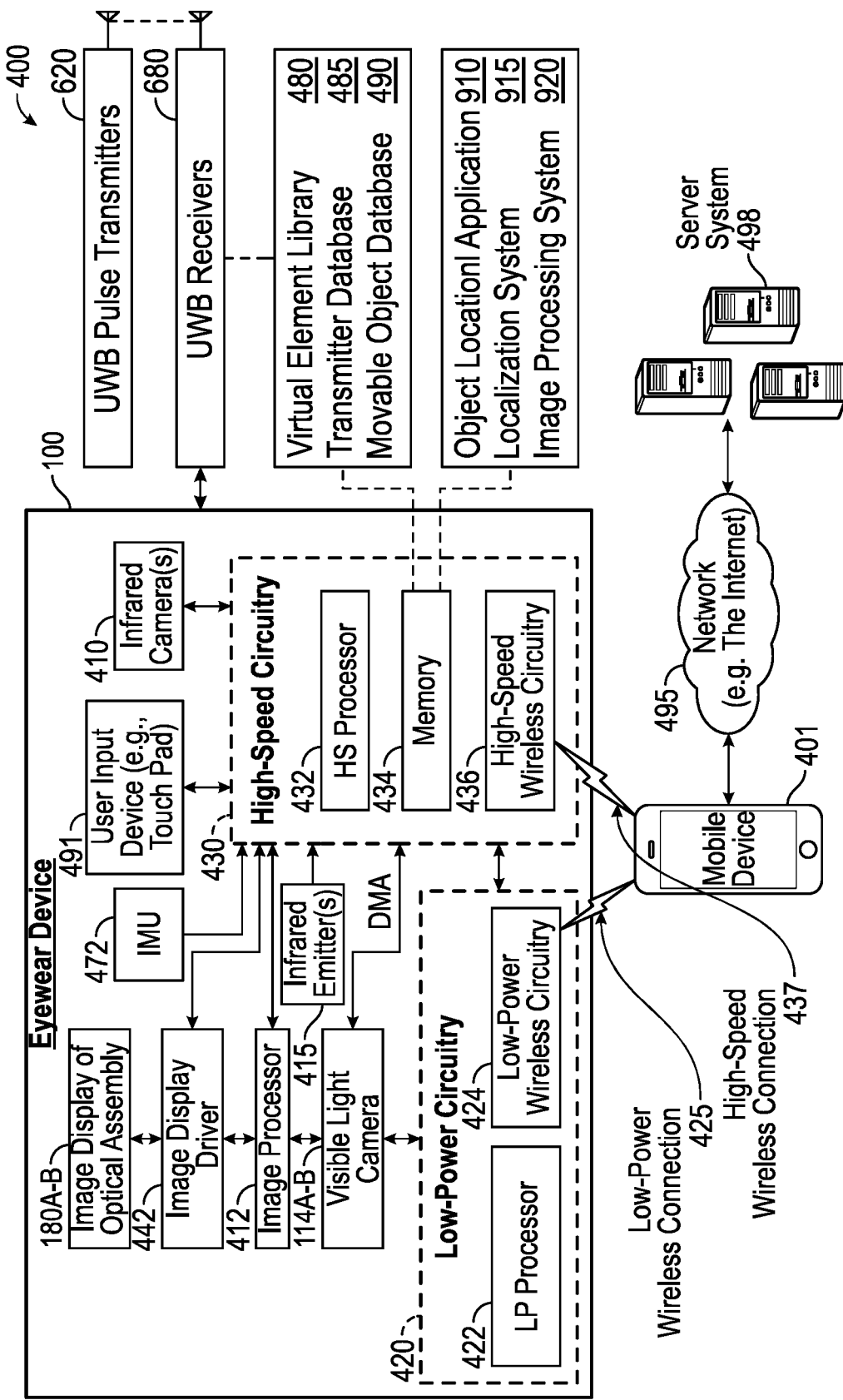
FIG. 4 is a functional block diagram of an example tracking and display system including pulse transmitters, receivers, a wearable device (e.g., an eyewear device) and a server system connected via various networks.

FIG. 4 is a functional block diagram of an example tracking and display system 400 that includes a wearable device (e.g., an eyewear device 100), a mobile device 401, and a server system 498 connected via various networks 495 such as the Internet. As shown, the tracking and display system 400 includes a low-power wireless connection 425 and a high-speed wireless connection 437 between the eyewear device 100 and the mobile device 401, as well as a wireless connection between the eyewear device 10 and one or more ultra-wideband (UWB) receivers 680.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
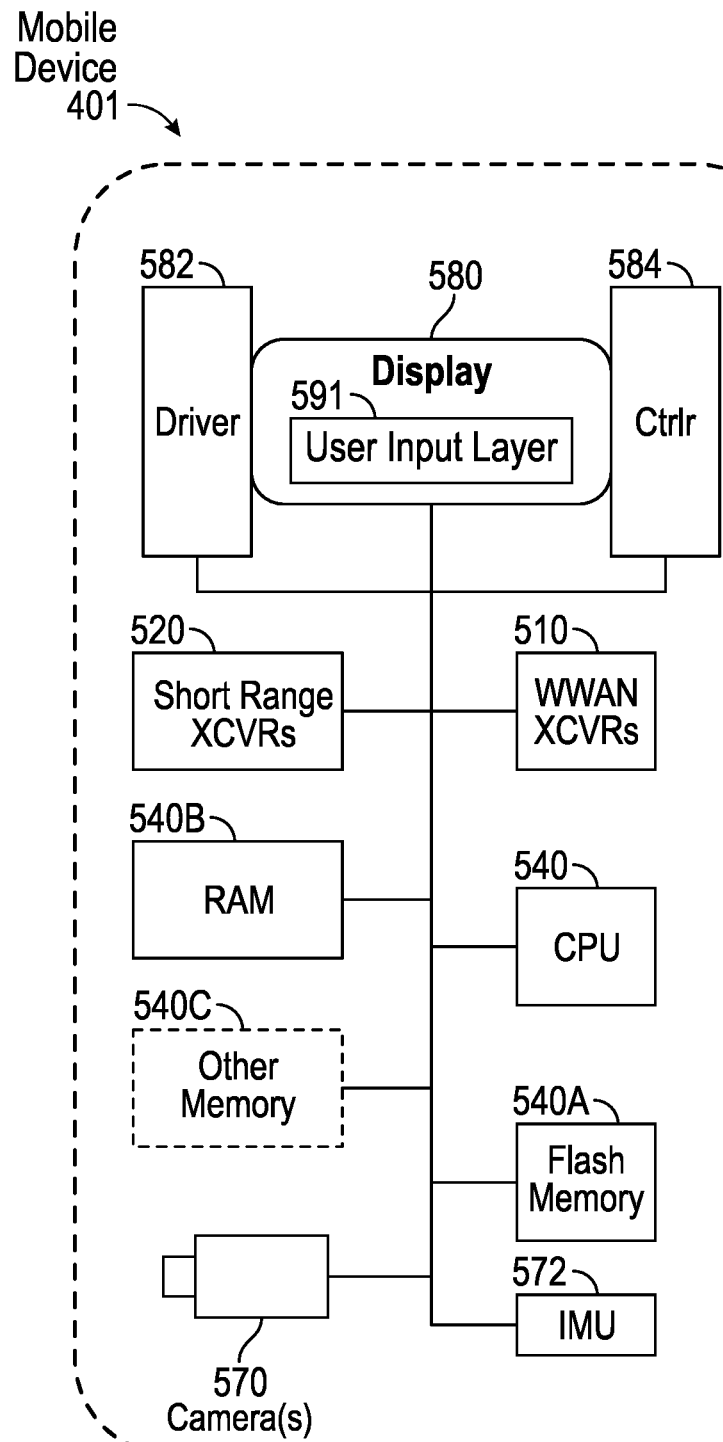
FIG. 5 is a diagrammatic representation of an example hardware configuration for a mobile device of the tracking and display system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using a low-power wireless connection 425 or a high-speed wireless connection 437. The mobile device 401 is connected to the server system 498 and the network 495. The network 495 may include any combination of wired and wireless connections.

The example tracking and display system 400, as shown in FIG. 4, includes a plurality of ultra-wideband (UWB) pulse transmitters 620 in wireless communication with one or more UWB receivers 680. The UWB receivers 680 are in wireless communication with one or more eyewear devices 100 which, in turn, are in wireless communication with one or more mobile devices 401. In some implementations, these devices 620, 680, 100, 401 operate as nodes in a network. Network data may be stored locally or remotely, on the servers or securely in the cloud. UWB transmitters 620 are paired with the UWB receivers 680. The eyewear devices 100 and mobile devices 410 operate as subscribers to the UWB system 620, 680.

One or more of the UWB receivers 680 in some example implementations are coupled to a virtual element library 480, a transmitter database 485, and a movable object database 490. The eyewear devices 100, as shown, may also be coupled to one or more of the database elements 480, 485, 490.

The virtual element library 480 stores data about each of a plurality of virtual elements 700, including a name, a serial number or other identifier, and a set of image assets for use in rendering the virtual element 700 for display in a variety of contexts. The virtual element library 480 may also include, for each virtual element 700, a desired size (e.g., six inches tall) relative to the physical environment, and data about the one or more movable objects 610 where the virtual element 700 will be displayed.

The transmitter database 485 stores data about each of the UWB pulse transmitters 620, including a unique transmitter identifier, a status, and a network number or other pairing information about the UWB receivers 680 to which each transmitter 620 is paired.

The movable object database 490 stores data about each of a plurality of movable objects 610, including an object name, an object identifier or stock keeping unit (SKU), and a copy of (or a relational link to) the unique transmitter identifier for each of the one or more UWB pulse transmitters 620 that are coupled to each movable object 610. For example, a movable object 610 such as a round tabletop may be associated with an object name (e.g., round tabletop), an object identifier or SKU (e.g., Tab-Round-4-09), and a copy of the unique transmitter identifier attached to the table (e.g., Tx-CTR-09). In practice, when a transmitter 620 is attached to a movable object 610, data about the movable object 610 is added to the movable object database 490. The movable object database 490 in some implementations also stores a predefined object mesh 611 which includes one or more known dimensions associated with each movable object 610. For example, the predefined object mesh 611 for a movable object 610, such as the round tabletop 610-1 shown in FIG. 7, may include a diameter and a thickness. If the movable object 610 includes the entire table, the object mesh 611 includes geometric data and dimensions associated with all parts of the table, including the top, pedestal, and legs. The object mesh 611 for other objects, such as folding chairs, collapsible tables, and machinery, may be geometrically complex. The predefined object mesh 611 for a door 610-2, shown in FIG. 7, may include a width, height, and thickness, as well as geometric data about the doorknob, hinges, panels, molding, rails, mullions, and other features of the door. The predefined object mesh 611 for a serving tray 610-3, shown in FIG. 7, may include a diameter and a thickness, as well as geometric data about the perimeter edge and other surface features.

The libraries and databases, in some implementations, operate as a set of relational databases with one or more shared keys linking the data to other database entries, and a database management system for maintaining and querying each database.

The example tracking and display system 400, as shown in FIG. 4, includes an object location application 910, a localization application 915, and a rendering application 920. The eyewear devices 100, as shown, may be coupled to one or more of the applications 910, 915, 920.

The object location application 910 includes the multilateration algorithms that compute the precise location of each pulse transmitter 620 in the network. Based on the location of each transmitter 620, the object location application 910 calculates a current location 615 for the movable object 610 associated with that particular transmitter 620 (e.g., by retrieving data stored in the databases 480, 485, 490). In some example implementations, object location application 910 is executed by or on one or more of the UWB receivers 680, as shown in FIG. 5

The localization application 915 determines a current location 902 of the eyewear device 100 relative to the physical environment. The localization data may be derived from the data in one or more images captured by a camera, an IMU unit 472, a GPS unit 473, or a combination thereof.

In some example implementations, the localization application 915 utilizes the fixed locations 685 of the one or more UWB receivers 680 to update the current eyewear position 902 relative to the physical environment 600. The processor 432 of the eyewear device 100 determines its position with respect to one or more receiver locations 685 relative to the coordinate system (x, y, z) for the physical environment 600, thereby determining the current eyewear position 902 within the coordinate system. Additionally, the processor 432 may determine a head pose (roll, pitch, and yaw) of the eyewear device 100 within the environment by using two or more receiver locations 685 or by using one or more other known location. In this example, the known receiver locations 685 operate similar to the registered locations of virtual markers in augmented reality.

In other example implementations, the processor 432 within the eyewear device 100 may construct a map of the physical environment 600 surrounding the eyewear device 100, determine a current location 902 of the eyewear device within the mapped environment, and determine a relative position of the eyewear device to one or more objects in the mapped environment. In some implementations, the processor 432 may construct the map and execute the localization application 915 to determine the current eyewear location 902 relative to the physical environment 600. The localization application 915 may utilize a simultaneous localization and mapping (SLAM) algorithm using data received from one or more sensors. Sensor data includes images received from one or both of the cameras 114A, 114B, distance(s) received from a laser range finder, position information received from a GPS unit 473, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Figure 8:
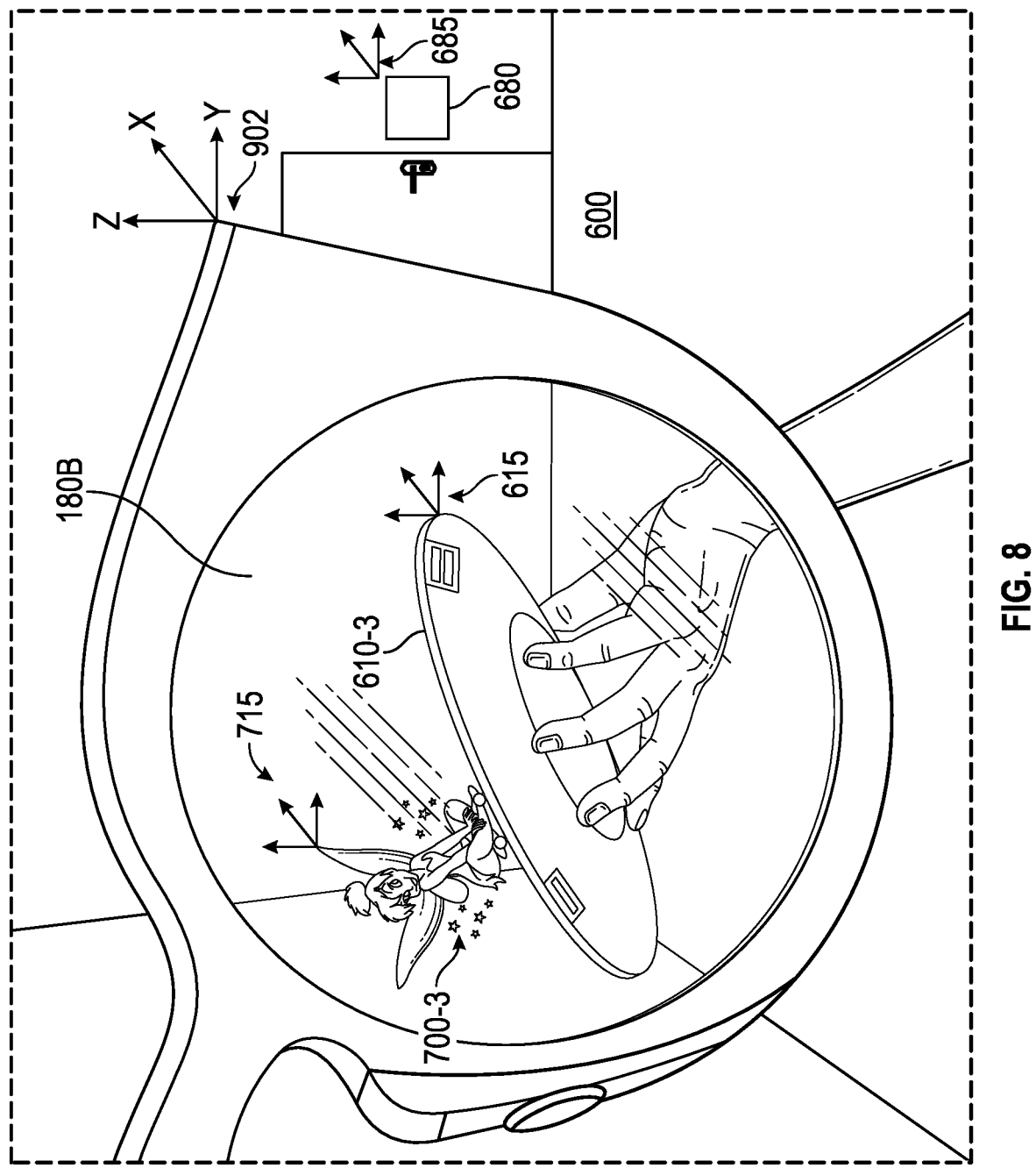
FIG. 8 is a perspective illustration of an example virtual element presented near a movable object on an eyewear display.

The rendering application 920 prepares a virtual element 700 for presentation on a display as an overlay relative to a movable object 610. In this context, the term "overlay" means and includes presenting a virtual element 700 on a display in the foreground, relative to a physical, movable object 610 which appears in the background, except in situations where part of the virtual element 700 is obscured by a portion of the movable object 610 (e.g., when a movable door partially obscures part of a virtual element 700 presented nearby). The rendering application 920 may utilize data from the object location application 910, including the current movable object location 615, and from the localization application 915, including the current eyewear location 902. With this data, the rendering application 920 presents the virtual element 700 for display near the current movable object location 615 and in relative proximity to the current eyewear location 902. As used herein, the term "relative proximity" means and includes the coordination in a physical space between and among the current eyewear location 902, the current movable object location 615 (in conjunction with the location of each attached pulse transmitter 620), the virtual element location 715, and the UWB receiver locations 685, all of which are expressed in coordinates (x, y, z) relative to the physical environment 600 (and relative to the eyewear location 902, in some implementations) as illustrated in FIG. 8. For example, presenting a virtual element 700 on the display 180B of an eyewear device 100 requires localizing the eyewear device 100 in the physical environment and calculating the movable object location 615, so the rendering application 920 can then present the virtual element 700 on the display so that it appears to be near the movable object 610. As both the eyewear device 100 and the movable object 610 are moving through the environment, the rendering application 920 continually updates the display so that the virtual element 700 persistently appears near the movable object 610. For example, as shown in FIG. 8, for a virtual element 700 (e.g., a seated figure) associated with a movable object 610 (e.g., a handheld serving tray), the rendering application 920 continually updates the display so the seated figure appears to remain on the serving tray as the serving tray moves, and with regard to any movement of the eyewear device 100 which supports the display 180B.

In a related aspect, the tracking and display system 400 accomplishes the real-time tracking of movable objects, and the display of virtual elements, without using computer vision and a tracking application (e.g., simultaneous localization and mapping (SLAM)). The physical environment 600, including the fixed features and stationary objects, is stored as a predefined static mesh 605, as described herein, instead of using a tracking application to map the fixed environment repeatedly. Nonetheless, in some implementations, the tracking and display system 400 cooperates with a tracking application that is configured to track moving items, such as people and objects which are not attached to a pulse transmitter.

The tracking and display system 400, as shown in FIG. 4, includes computing devices, including the eyewear device 100, mobile device, and receivers 680, in a network. The applications 910, 915, 920 utilize a memory for storing instructions and a processor for executing the instructions. Execution of the instructions configure the devices to communicate, exchange data, and otherwise cooperate in the network. The applications may utilize the memory 434 of the eyewear device 100, the memory elements 540A, 540B, 540C of the mobile device 401, and any memory elements associated with the server 490 and the UWB receivers 680 or transmitters 620. Moreover, the applications may utilize the processor elements 432, 422 of the eyewear device 100, the central processing unit (CPU) 530 of the mobile device 401, and any processing elements associated with the server 490 and the UWB receivers 680 or transmitters 620. In this this aspect, the memory and processing functions of the tracking and display system 400 can be shared or distributed across the processors and memories of the eyewear device 100, the mobile device 401, the server system 498, and the UWB receivers 680 and transmitters 620.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 891 for receiving input (by touch, multi-touch, or gesture, and the like, by hand, stylus, or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The client device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in on or more memory elements 540A, 540B, 540C and executed by the CPU 530 of the client device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Figure 6:
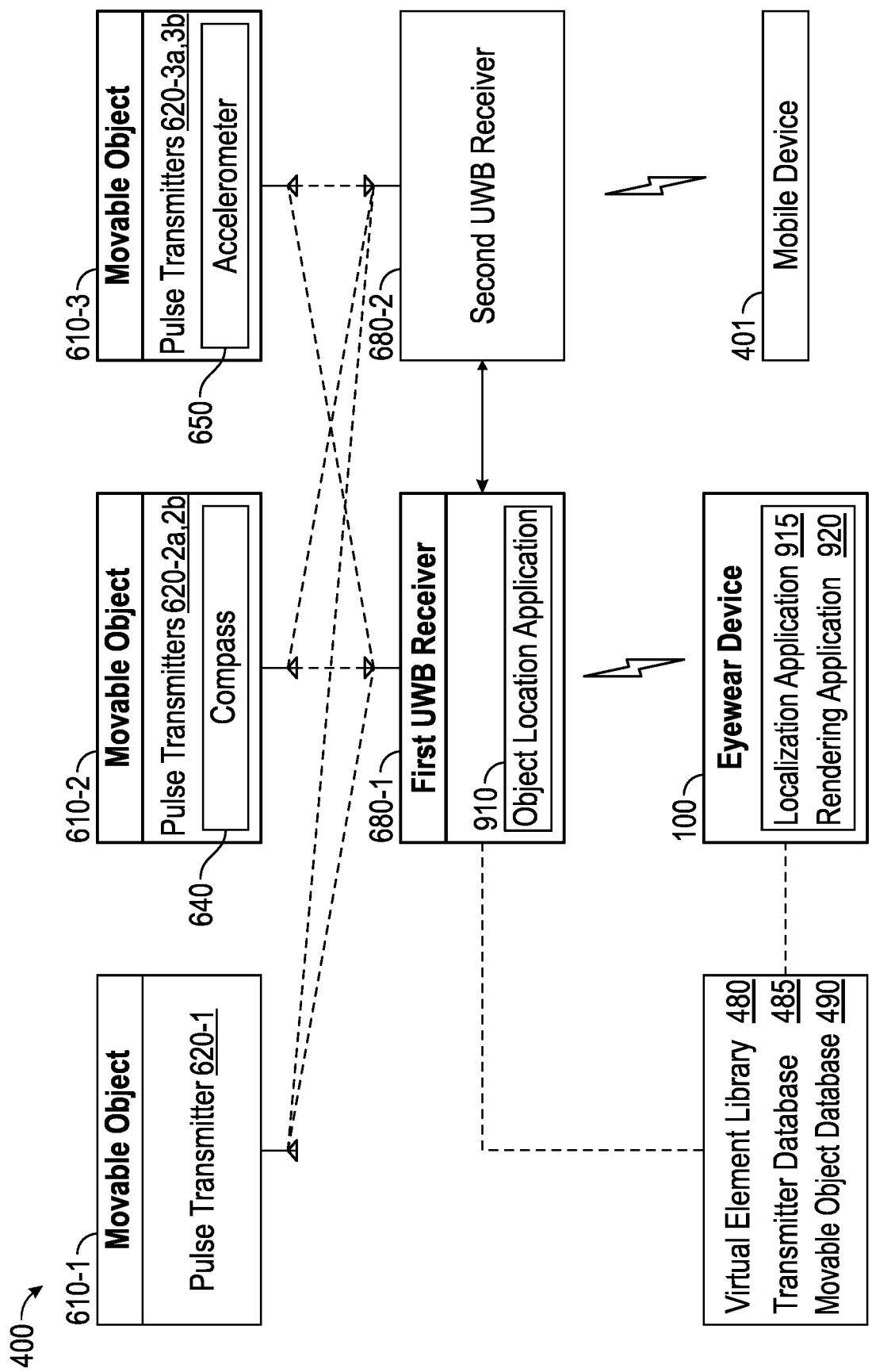
FIG. 6 is a functional block diagram of an example tracking and display system including ultra-wideband pulse transmitters coupled to movable objects, two ultra-wideband receivers, one or more eyewear devices, one or more mobile devices, and a collection of database elements.

FIG. 6 is a functional block diagram of an example tracking and display system 400 including ultra-wideband (UWB) pulse transmitters 620 coupled to movable objects 610, two UWB receivers 680, one or more eyewear devices 100, one or more mobile devices 410, and a collection of database elements 480, 485, 490 as described herein. Each UWB pulse transmitter 620 includes an antenna, as shown, for wireless communication with the UWB receivers 680.

Each broadcast pulse includes a unique transmitter identifier which is used by the UWB receivers 680 to identify the transmitter that broadcast each pulse. The pulse includes a data packet comprising a preamble and a payload, which contains bits of data. The physical layer of each pulse is assembled according to the standards set forth in IEEE 802.15.4a and 4z. The pulse a short burst of electromagnetic energy having a duration sufficient to extract the bits of data, including data for measuring or determining the position of the transmitter.

In this example, a first pulse transmitter 620-1 is attached or coupled to a first movable object 610-1. Attached to the second movable object 610-2 is a pair of second pulse transmitters 620-2a, 620-2b, and a compass 640. Attached to the third movable object 610-3 is a pair of third pulse transmitters 620-3a, 620-3b, and an accelerometer 650.

The UWB receivers 680 are placed in a physical environment 600 at fixed receiver locations 685, as shown in FIG. 8. The UWB receivers 680 are time synchronized because the multilateration algorithms use the difference between the times of arrival for each pulse at each receiver 680 to calculate the precise location of each transmitter 620. The precise location of each transmitter 620 is then used to calculate a current object location 615 associated with each movable object 610. In the example shown in FIG. 6, the first UWB receiver 680-1 includes an object location application 910 for calculating the current object location 615.

The UWB receivers 680 are in paired wireless communication with one or more eyewear devices 100 and with one or more mobile devices 401, as shown. The transmitters 620, receivers 680, eyewear devices 100, and mobile devices 401 operate as nodes in a network. The transmitters 620 are paired with the receivers 680. The eyewear devices 100 and mobile devices 410 operate as subscribers to the UWB system 620, 680.

The eyewear device 100 as described herein includes a processor, a memory, a localization application 915, a rendering application 920, and a display 180B (as shown in FIG. 8). In use, the localization application 915 determines a current eyewear location 902 for each eyewear device 100. The rendering application 920 presents a virtual element 700 on the display 180B at a virtual element location 715 as an overlay relative to the calculated current object location 615 and in relative proximity to the determined current eyewear location. For example, as illustrated in FIG. 8, the process of rendering and presenting a virtual element 700 on the display 180B of an eyewear device 100 requires localizing the eyewear device 100 with the physical environment 600 and calculating the movable object location 615, so the rendering application 920 can then present the virtual element 700 on the display so that it appears to be near the movable object 610.

The virtual element 700 may be presented near the center of the movable object 610 or at some other specified location or defined anchor point on the movable object 610. Although the examples virtual elements shown herein are figures, the virtual element 700 may include any of a variety of elements suitable for rendering on a display, including figurative or realistic items, static or moving, alone or in combination with other items. The virtual element 700 may include any graphical element suitable for rendering or presentation on a display, including but not limited to virtual objects associated with VR or AR experiences, game pieces related to a gaming experience, graphical elements such as icons, thumbnails, taskbars, and menu items, and selection control elements such as cursors, pointers, buttons, handles, and sliders; any of which may or may not be associated with a graphical user interface (GUI).

Figure 7:
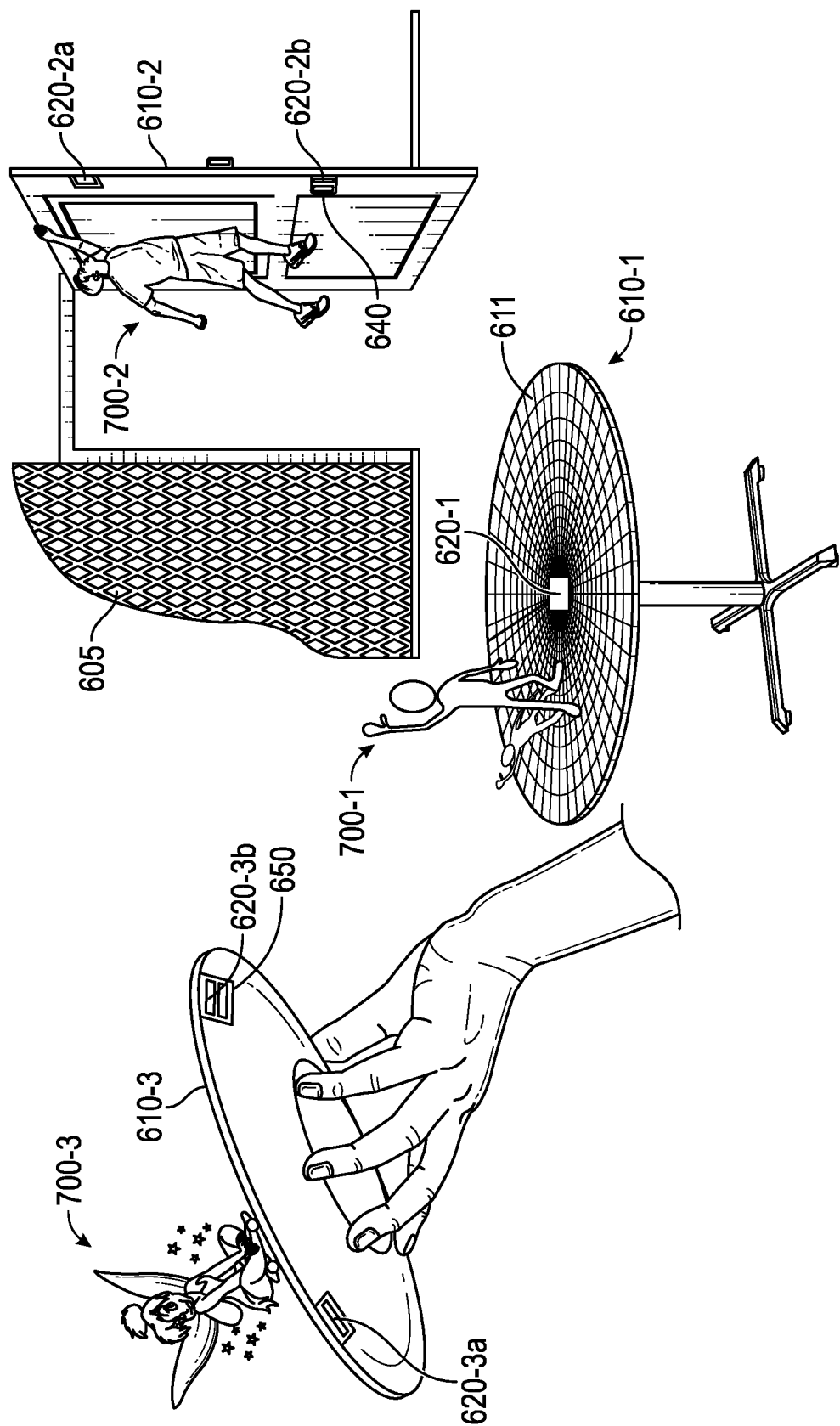
FIG. 7 is a perspective illustration of an example physical environment showing ultra-wideband pulse transmitters coupled to movable objects, an example object mesh, and a portion of a static mesh.

For example, FIG. 7 is a perspective illustration of an example physical environment, as seen through a display (not shown), depicting virtual elements 700 presented near movable objects 610. A first virtual element 700-1 (e.g., a standing figure) is presented near a first movable object 610-1 (e.g., a round tabletop). Attached to the tabletop is a first pulse transmitter 620-1. In this example, a single pulse transmitter 620-1 attached to a known point, such as the center, along with the object mesh 611 as described herein, is sufficient to calculate the current object location 615 because a tabletop typically moves in a single plane.

A second virtual element 700-2 (e.g., a hanging figure) is presented near a second movable object 610-2 (e.g., a door). Attached to the door is a pair of second pulse transmitters 620-2a, 620-2b and a compass 640, either or both of which may be used to calculate the current object location 615 of the door. The compass 640 may broadcast its own compass signal or, in some implementations, the broadcast pulse is composed so the data packet includes the compass data. The pair of transmitters 620-2a, 620-2b and the compass 640 are sufficient to calculate the current object location 615 (which includes both position and orientation) because the door is movable in two dimensions, relative to its hinges.

A third virtual element 700-3 (e.g., a seated figure) is presented near a third movable object 610-3 (e.g., a serving tray). Attached to the tray is a pair of third pulse transmitters 620-3a, 620-3b and an accelerometer 650, both of which may be used to calculate the current object location 615 (position, orientation, and heading) of the tray. The accelerometer 650 may broadcast its own accelerometer signal or, in some implementations, the broadcast pulse is composed so the data packet includes the accelerometer data. Data from the accelerometer 650 provides information about the motion of the serving tray, which is movable in three dimensions, through the environment, over time.

Both the eyewear device 100 and the movable objects 610 are free to move through the environment. The rendering application 920 continually updates the display so that the virtual element 700 persistently appears near the movable object 610. For example, as shown in FIG. 8, for a virtual element 700 (e.g., a seated figure) associated with a movable object 610 (e.g., a handheld serving tray), the rendering application 920 continually updates the display so the seated figure appears to remain on the serving tray as the serving tray moves, and with regard to any movement of the eyewear device 100 which supports the display 180B.

As the eyewear 100 or the movable object 610 moves, over time, the apparent size of the virtual element 700 changes, depending on its current location 615 relative the eyewear location 902. In this aspect, the virtual element library 480 includes, for each virtual element 700, a desired size relative to the physical environment 600 (along with a plurality of image assets used during by the rendering application 920). In use, the rendering application presents the virtual element 700 at a current size based on the image assets, the desired size, and the calculated current object location 615, such that the virtual element 700 appears persistently at the desired size relative to the movable object 610 as it moves through the physical environment.

In some example implementations, the pulse transmitter 620 includes a power supply (e.g., a battery), a pulse generator, a transmitter, an antenna, and a read-only memory (ROM) or a chip with read-write capability. The ROM includes an object identifier or stock keeping unit (SKU) associated with the movable object, and a predefined object mesh 611 (as shown near the round tabletop 610-1 in FIG. 7). The predefined object mesh 611 which includes one or more known dimensions associated with each movable object 610. The object mesh 611 may be generated and stored in one or more formats, to enable spatial reconstruction using various computer vision and AR applications. The object mesh 611, for example, may include a point cloud, a solid model (e.g., useful with computer-aided drawing or drafting (CAD) applications), a surface model, or a set of planar surfaces. For example, the predefined object mesh 611 for the round tabletop 610-1 includes a diameter and a thickness. In this example, data about the object mesh 611 (stored in the ROM) is included in the broadcast pulse, so that the object location application 910 utilizes the object mesh 611 in calculating the current objection location 615. Points along the object mesh 611 may be used by the rendering application 920 to place the virtual element 700 at a particular location on the movable object 610.

In another example implementation, the predefined object mesh 611 is stored in the movable object database 490, along with the object identifier or stock keeping unit (SKU) associated with the movable object.

As shown in FIG. 7, the example tracking and display system 400 may include a static mesh 605 associated with the physical environment 600. A portion of the static mesh 605 is shown near the door in FIG. 7. In use, the static mesh 605 includes dimensions associated with a plurality of stationary objects located in the physical environment, including the walls, floors, ceiling, and structures and features that are fixed or stationary. The rendering application 920 presents the virtual elements 700 relative to the stationary objects as described and stored in the static mesh 605. In this aspect, the rendering application 920 utilizes the static mesh 605 to establish a display priority for the virtual elements 700 and the movable objects 610, so that the objects nearest the eyewear 100 are displayed in the foreground, and the objects or portions of objects further away are displayed in the background. For example, a stationary object defined in the static mesh 605 (e.g., a column) is utilized by the rendering application 920 to selectively obscure all or part of a virtual element 700 when the column is located in the foreground, between the virtual element 700 and the eyewear 100.

In another aspect, the static mesh 605 is utilized to establish a map of the fixed environment, without the need for a tracking application (e.g., a SLAM algorithm) to continuously scan and map the fixed environment.

In some implementations, the tracking and display system 400 cooperates with a tracking application that is configured to track moving items, such as people and objects which are not attached to a pulse transmitter. In this example, the tracking application is limited to tracking only those moving items which are not attached to a pulse transmitter and not registered and stored in the movable object database 490. In other words, real-time scanning and tracking of the static mesh 605 and those movable objects 610 defined by an object mesh 611 is disabled, conserving computing resources without sacrificing precision location and tracking.

In this example, a camera system coupled to the eyewear device 100 captures frames of video data as the eyewear moves through the physical environment. The tracking application is synchronized in time with the UWB receivers 680 and with the object location application 910; and synchronized in space relative to the physical environment. The camera system, in some implementations, includes one or more high-resolution, digital cameras equipped with a CMOS image sensor capable of capturing high-definition still images and high-definition video at relatively high frame rates (e.g., thirty frames per second or more). Each frame of digital video includes depth information for a plurality of pixels in the image. In this aspect, the camera operates as a high-definition scanner by capturing a detailed input image of the physical environment. The camera, in some implementations, includes a pair of high-resolution digital cameras 114A, 114B coupled to the eyewear device 100 and spaced apart to acquire a left-camera raw image and a right-camera raw image, as described herein. When combined, the raw images form an input image that includes a matrix of three-dimensional pixel locations. The tracking application analyzes captured frames of video data and identifies one or more moving items in the physical environment relative to the static mesh 605. Using the locations of the identified moving items, the rendering application 920 presents the virtual element 700 on the display relative to the identified moving items.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating system. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system for displaying a virtual element, comprising:
a transmitter configured to couple with a movable object associated with a current object location in a physical environment and to broadcast a pulse, wherein the pulse comprises a unique identifier and a predefined object mesh associated with the movable object, and wherein the current object location is based on the pulse;
an eyewear device comprising a localization application, a rendering application, and a display, wherein a current eyewear location is estimated by the localization application; and
a virtual element presented by the rendering application on the display at a virtual element location as an overlay relative to the predefined object mesh, wherein the virtual element location is based on the current object location and the current eyewear location.

2. The system of claim 1, wherein the predefined object mesh comprises known dimensions associated with the movable object.

3. The system of claim 1, further comprising:
a static mesh comprising dimensions associated with a plurality of stationary objects located in the physical environment, wherein the rendering application presents the virtual element in accordance with the static mesh.

4. The system of claim 3, further comprising:
a camera coupled to the eyewear device and configured to capture frames of video data of the physical environment; and
a tracking application configured to identify, in the captured frames of video data, a plurality of moving items in the physical environment relative to the static mesh, wherein the rendering application presents the virtual element on the display relative to the identified plurality of moving items.

5. The system of claim 1, further comprising:
at least two synchronized receivers located at fixed receiver locations relative to the physical environment, wherein the receivers are in paired communication with the eyewear device, and
wherein the receivers calculate the current object location based on the broadcast pulse.

6. The system of claim 1, wherein the transmitter comprises an ultra-wideband pulse transmitter comprising a power supply, a pulse generator, a transmitter, an antenna, and a read-only memory,
wherein the unique identifier is stored in the read-only memory,
wherein the predefined object mesh is stored in the read-only memory,
wherein the pulse generator composes the pulse, and
wherein the transmitter broadcasts the pulse.

7. The system of claim 1, further comprising:
a compass coupled to the movable object and configured to broadcast a compass signal, wherein the current object location is based on the broadcast compass signal; and
an accelerometer coupled to the movable object and configured to broadcast an accelerometer signal, wherein the current object location is based on the broadcast accelerometer signal.

8. The system of claim 1, wherein the current object location comprises a current object position and a current object orientation relative to the physical environment, the system further comprising:
a second transmitter coupled to the movable object at a known distance from the transmitter and configured to broadcast a second pulse, wherein the current object orientation is based on the broadcast second pulse.

9. The system of claim 1, further comprising:
a virtual element library comprising, for each of a plurality of virtual elements, a plurality of image assets and a desired size relative to the physical environment, wherein the rendering application presents the virtual element at a current size based on the image assets, the desired size, and the current object location, such that the virtual element appears persistently at the desired size relative to the physical environment.

10. The system of claim 1, further comprising:
a movable object database comprising, for each of a plurality of movable objects, a unique identifier and a predefined object mesh.

11. A method of displaying a virtual element, comprising:
receiving a pulse broadcast by a transmitter configured to couple with a movable object in a physical environment, wherein the pulse comprises a unique identifier and a predefined object mesh associated with the movable object;
calculating a current object location associated with the movable object based on the pulse;
estimating a current eyewear location associated with an eyewear device, the eyewear device comprising a display; and
presenting on the display at a virtual element location a virtual element as an overlay relative to the predefined object mesh, wherein the virtual element location is based on the current object location and the current eyewear location.

12. The method of claim 11, wherein the predefined object mesh comprises known dimensions associated with the movable object, and
wherein presenting the virtual element further comprises presenting the virtual element in accordance with a static mesh comprising dimensions associated with a plurality of stationary objects located in the physical environment.

13. The method of claim 12, further comprising:
capturing frames of video data of the physical environment using a camera coupled to the eyewear device; and
identifying a plurality of moving items in the physical environment relative to the static mesh, wherein presenting the virtual element further comprises presenting the virtual element on the display relative to the identified plurality of moving items.

14. The method of claim 11, further comprising:
pairing with the eyewear device at least two synchronized receivers located at fixed receiver locations relative to the physical environment, wherein the receivers calculate the current object location.

15. The method of claim 11, wherein the transmitter comprises an ultra-wideband pulse transmitter comprising a power supply, a pulse generator, a transmitter, an antenna, and a read-only memory storing the unique identifier and the predefined object mesh, the method further comprising:
generating the pulse using the pulse generator; and
broadcasting the pulse using the transmitter.

16. The method of claim 11, wherein calculating the current object location further comprises:
receiving a compass signal broadcast from a compass coupled to the movable object; and
receiving an accelerometer signal from an accelerometer coupled to the movable object,
wherein the current object location is based on at least one of the broadcast compass signal and the broadcast accelerometer signal.

17. The method of claim 11, wherein the current object location comprises a current object position and a current object orientation relative to the physical environment, the method further comprising:
estimating the current object orientation is based on a second pulse broadcast from a second transmitter coupled to the movable object at a known distance from the transmitter.

18. The method of claim 11, wherein presenting the virtual element further comprises:
retrieving the virtual element from a virtual element library comprising, for each of a plurality of virtual elements, a plurality of image assets and a desired size relative to the physical environment;
rendering the virtual element at a current size based on the image assets, the desired size, and the current object location, such that the virtual element appears persistently at the desired size relative to the physical environment.

19. A non-transitory computer-readable medium storing program code which, when executed, is operative to cause an electronic processor to perform steps, the steps including:
receiving a pulse broadcast by a transmitter configured to couple with a movable object in a physical environment, wherein the pulse comprises a unique identifier and a predefined object mesh associated with the movable object;
calculating a current object location associated with the movable object based on the pulse;
estimating a current eyewear location associated with an eyewear device, the eyewear device comprising a display; and
presenting on the display at a virtual element location a virtual element as an overlay relative to the predefined object mesh, wherein the virtual element location is based on the current object location and the current eyewear location.

20. The non-transitory computer-readable medium storing program code of claim 19, wherein the program code, when executed, is operative to cause the electronic processor to perform the steps of:
presenting the virtual element in accordance with a static mesh comprising dimensions associated with a plurality of stationary objects located in the physical environment;
capturing frames of video data of the physical environment using a camera coupled to the eyewear device; and
identifying a plurality of moving items in the physical environment relative to the static mesh, wherein presenting the virtual element further comprises presenting the virtual element on the display relative to the identified plurality of moving items.

* * * * *